United States Patent
Polastre et al.

(10) Patent No.: US 7,991,915 B2
(45) Date of Patent: Aug. 2, 2011

(54) SOFTWARE PLATFORM FOR RADIO NETWORK

(75) Inventors: Joseph Polastre, San Francisco, CA (US); Courtney Sharp, San Francisco, CA (US); Robert Szewczyk, Castro Valley, CA (US)

(73) Assignee: Sentilla Corporation, Redwood City, CA (US)

( * ) Notice: Subject to any disclaimer, the term of this patent is extended or adjusted under 35 U.S.C. 154(b) by 85 days.

(21) Appl. No.: 12/432,628

(22) Filed: Apr. 29, 2009

(65) Prior Publication Data

US 2009/0276484 A1 Nov. 5, 2009

Related U.S. Application Data

(60) Provisional application No. 61/050,549, filed on May 5, 2008.

(51) Int. Cl.
*G06F 15/16* (2006.01)

(52) U.S. Cl. .......................................... 709/246; 709/203

(58) Field of Classification Search .................. 709/246, 709/223–238, 212, 217, 203; 370/230, 230.1, 370/229, 300; 719/311, 318, 313, 328; 341/50–59; 708/204
See application file for complete search history.

(56) References Cited

U.S. PATENT DOCUMENTS

| | | | |
|---|---|---|---|
| 4,791,558 A * | 12/1988 | Chaitin et al. | 717/140 |
| 5,822,569 A | 10/1998 | McPartlan et al. | |
| 7,216,142 B2 * | 5/2007 | Whipple et al. | 709/203 |
| 7,546,340 B2 * | 6/2009 | Terasawa | 709/203 |
| 2004/0230605 A1 * | 11/2004 | Tamboli et al. | 707/102 |
| 2007/0233883 A1 | 10/2007 | De Lutiis et al. | |

OTHER PUBLICATIONS

Chlipala, A. et al., "Deluge: Data Dissemination for Network Reprogramming at Scale," Fall 2003 Class Project, CS262/CS294-1, University of California at Berkeley, [Online] [Retrieved on Jul. 28, 2009] Retrieved from the Internet<URL:http://www.cs.berkeley.edu/~jwhui/deluge/cs262/cs262a-report.pdf>.

Levis, P. et al., "Trickle: A Self-Regulating Algorithm for Code Propagation and Maintenance in Wireless Sensor Networks," [Online] [Retrieved on Jul. 28, 2009] Retrieved from the Internet<URL:http://csl.stanford.edu/~pal/pubs/trickle-nsdi04.pdf>.

Shapiro, P., "BitTorrent: Making Bulky Video Files Easier to Share," Digital Divide Network, Dec. 10, 2004, [Online] [Retrieved on Jul. 28, 2009] Retrieved from the Internet<URL:http://www.digitaldivide.net/articles/view.php?ArticleID=26>.

PCT International Search Report and Written Opinion, PCT Application No. PCT/US09/42584, Jun. 18, 2009, 7 pages.

\* cited by examiner

*Primary Examiner* — Wing Chan
*Assistant Examiner* — Ruolei Zong
(74) *Attorney, Agent, or Firm* — Fenwick & West LLP (57) ABSTRACT

A pervasive computing system comprises a set of client devices and a network of small computing units, referred to as nodes. The client devices and nodes run programs that communicate with each other to solve a given problem, but the client devices and the nodes use different software execution environments and protocols. A host server acts as an intermediary between the client devices and the nodes, bridging the gap between the different software execution environments and protocols of the client devices and the nodes.

25 Claims, 4 Drawing Sheets

SOFTWARE PLATFORM FOR RADIO NETWORK

CROSS REFERENCE TO RELATED APPLICATIONS

This application claims the benefit of Provisional Application No. 61/050,549, filed on May 5, 2008, which is hereby incorporated herein by reference.

BACKGROUND

The present invention generally relates to the field of software systems, and more specifically, to a software platform for facilitating data interchange between units of a pervasive computing system.

Pervasive computing, also known as ubiquitous computing, is an emerging field involving the distribution of data monitoring and processing capabilities beyond a small number of traditional server or client computer systems to additionally include a large number of very small computing units, or nodes, distributed at strategic locations throughout a target environment. The use of large numbers of such nodes has been rendered technologically and economically feasible by recent improvements in electronics design and manufacturing, and this approach may be employed in a number of different applications to solve different categories of problems. For example, in one application, the nodes may be embedded within the structure of a bridge, collecting data such as current structural rigidity in order to continuously monitor and report on the safety and stability of the bridge by providing data to a server-side program. As another example, the nodes may be used in control systems to monitor and control the operations of devices, such as controlling heat output and calculating statistics on the amount of energy expended. As a further example, the nodes could be used to monitor and report on the temperature of devices used in manufacturing, and to issue a warning if the temperature of any devices rises above a safe level. The number of such applications which may be constructed using the nodes is numerous and greatly varied.

In conventional systems employing such nodes, creating and deploying the programs that run on the client, servers, and nodes is difficult. This is particularly so in the case of one or more networks of nodes, each node of which has limited hardware resources and thus typically requires its programs to be written in a very low-level language, such as C or assembly. Since client and server systems lack such hardware constraints, their programs are typically written in a higher-level language, such as Java. Further, the nodes, having limited resources, typically use different protocols, e.g. communication protocols, than the more powerful clients. Thus, enabling node and client programs to communicate to solve a given problem is difficult, requiring proper translation both of programs and other data and of protocols. Such translation requires a great deal of effort and care, requiring tedious and error-prone programming to implement.

SUMMARY

A pervasive computing system comprises a set of client devices and a network of small computing units, referred to as nodes. The client devices and nodes run programs that communicate with each other to solve a given problem, but the client devices and the nodes use different software execution environments and protocols. A host server acts as an intermediary between the client devices and the nodes, bridging the gap between the different software execution environments and protocols of the client devices and the nodes.

In one embodiment, the client devices execute programs written using an object-oriented programming language. The host server then provides translation of objects and classes into a form executable on the nodes, and further implements communications protocols and protocol translations of both the client devices and the nodes.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
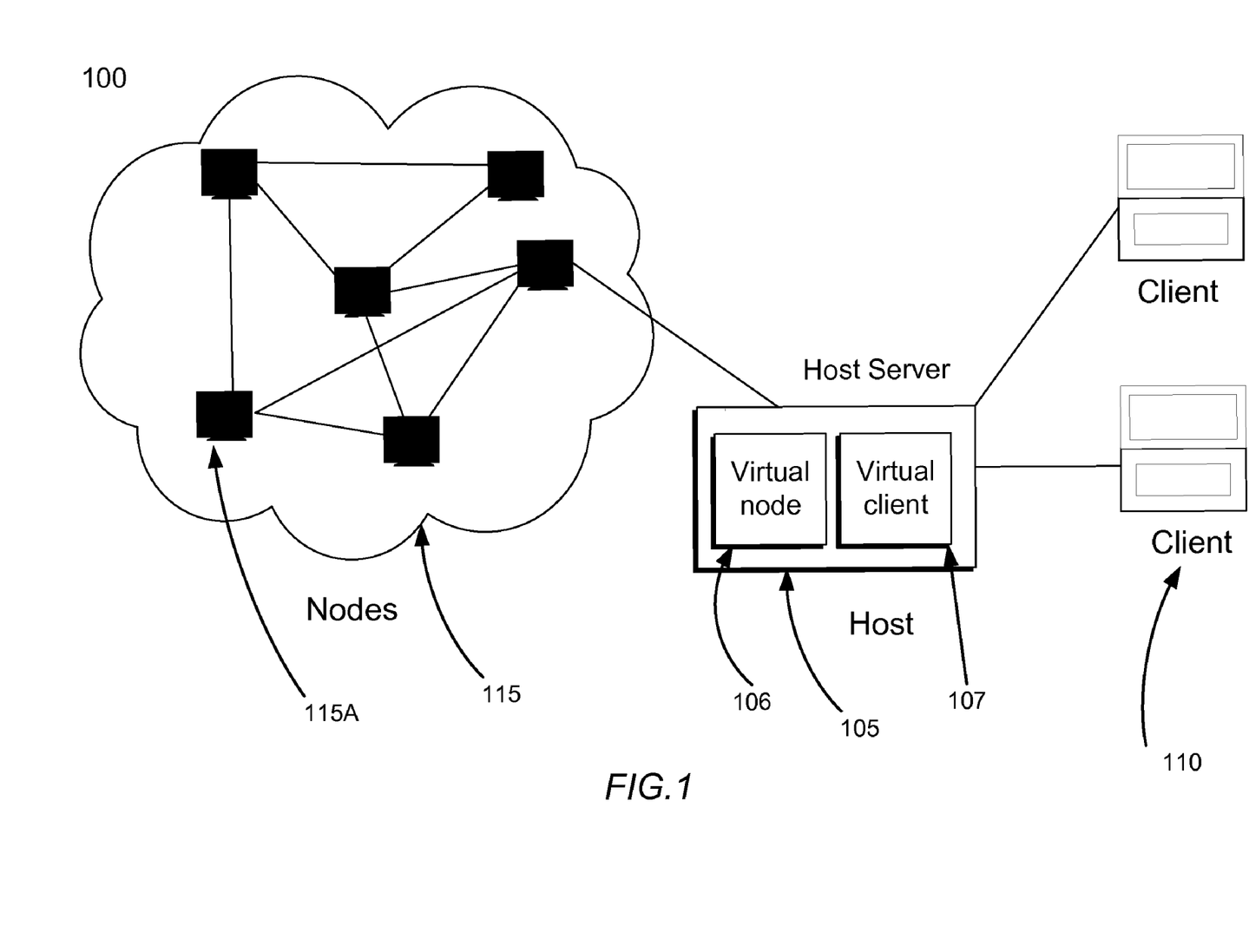
FIG. 1 is a block diagram of a pervasive computing environment in accordance with one embodiment of the present invention.

FIG. 1 is a block diagram illustrating the physical architecture 100 of a pervasive computing system according to one embodiment. In order to solve a particular problem, such as the monitoring of temperature within a given area or metering of electricity usage, one or more client devices 110 communicate with a network 115 of small computing units, or nodes (115A), with any necessary data translation being provided by a host server 105. The various cooperating programs run by the client devices 110, nodes 115A, and host servers 105 constitute an application for solving a given problem.

There may be any number of nodes 115A within node network 115, from only one or two to hundreds, thousands, or more. The nodes 115A may be arranged in any configuration, as appropriate for the application for which they are employed. In one embodiment, communication between individual nodes 115A and the host 105 occurs via short-distance radio transmission, such that some nodes 115A may not be able to communicate directly with other nodes within the node network 115. In such a case, the transmission protocols employed within the node network 115 must support data forwarding in order to allow communication across the entire set of nodes 115A. The nodes 115A of node network 115 may all be running programs designed to solve the same problem, or they may be running different applications but using a common host server 105. In one embodiment, the various nodes 115A may be physically different and have different software execution environments. A given node network 115 may have exactly one host server 105, or may have multiple host servers 105. Similarly, a given host server 105 may communicate with a single node network 115, or with many.

The client devices 110 can serve several purposes within the architecture 100. They can be used for development of the programs that together solve the problem in question. This includes both the programs that execute on the clients 110, and those that execute on the nodes 115A. In one embodiment, a client 110 used for program development includes an integrated development environment used to author and debug programs and to deploy them across the architecture 100.

Additionally, the client devices 110 can execute the client programs, including displaying data and accepting user input, as appropriate to the problem. For example, when the problem is that of monitoring device temperatures, a client application could graphically display the monitored devices and their temperatures, and accept input specifying that a particular device should be shut off or run in a different manner. It is appreciated that a client device 110 that executes the applications need not be the same client 110 that is used to develop the applications. A given client device 110 might perform either or both functions. Physically, the client devices 110 may be any one of a number of conventional computing devices including, but not limited to, desktop computer systems, laptop computer systems, mainframe systems, personal digital assistants (PDAs), or cellular phones. In one embodiment, a client device 110 uses, as one of its software execution environments, a standard Java virtual machine. (A "software execution environment" as described herein represents the physical and/or software environment required to execute the programs in question. For example, a Java virtual machine supporting class files and objects having a particular data format is one instance of a software execution environment.) In another embodiment, a client device 110 uses, as one of its software execution environments, a web platform (such as Python, Perl, Ruby, or PHP) to present data objects to users through the Internet.

A client 110 communicates with a host server 105, and thence indirectly with a node network 115, using a conventional computer communications network. In one embodiment, the communications network is the Internet or a LAN. The communications network can also use dedicated or private communications links that are not necessarily part of the Internet. In one embodiment, the communications network uses standard communications technologies and/or protocols such as Ethernet, 802.11, etc. Similarly, the networking protocols used on the communications network can include the transmission control protocol/Internet protocol (TCP/IP), the hypertext transport protocol (HTTP), or the like. The data exchanged over the network 130 can be represented using technologies and/or formats including the hypertext markup language (HTML), the extensible markup language (XML), etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The host server 105, among its other functions, acts as an intermediary between the nodes 115A and the clients 110, which use different communication protocols, for example. This intermediary functionality is accomplished using a "virtual node" 106, which, as discussed below in more detail, is accomplished with code implementing a node application programming interface (API) and providing data format translation. Similarly, by executing code implementing client communications protocols, the host server 105 also implements a "virtual client" 107. Thus, both nodes 115A and clients 110 may communicate with each other using their own protocols, without knowing about protocols and data formats other than their own. The host server 105 may have any number of virtual nodes 106 and virtual clients 107, though for simplicity only one virtual node and one virtual client are depicted in FIG. 1.

Figure 2:
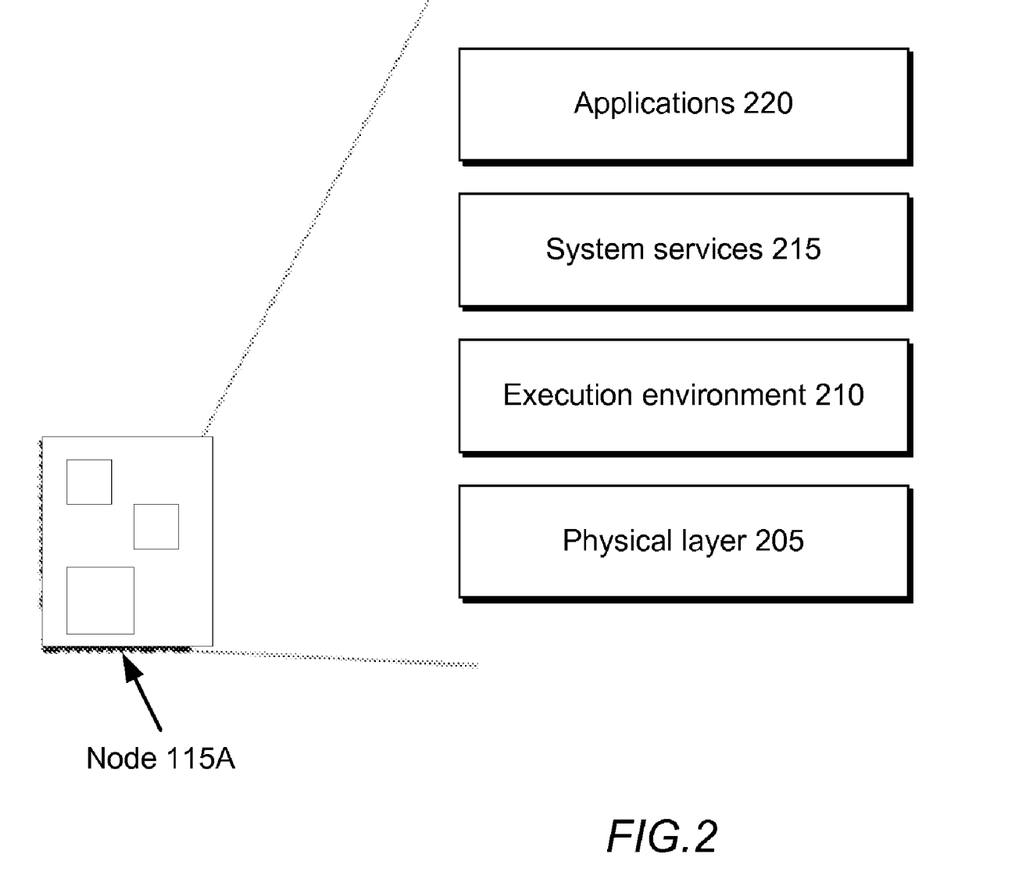
FIG. 2 illustrates in greater detail the design of a node according to one embodiment.

FIG. 2 illustrates in greater detail the logical design of a node 115A, according to one embodiment. As previously noted, a node 115A is a small computing device having limited physical resources. Typically, a node 115A is not connected to a power grid but is powered by a battery, and lacks mechanical components such as hard disks, fans, or input/output devices such as mice, keyboards, printers, monitors, etc. Further, a node 115A typically lacks physical ports or other connectors for communication with other computing systems or for accepting physical media such as floppy disks, flash memory cards, and the like, instead relying only on low-power wireless communications. As a specific example, in one embodiment a node has approximately 10 kilobytes (KB) of random-access memory (RAM) and 48 KB of flash memory, runs at 8 MHz on a processor with a 16-bit architecture such as an INTEL 8085 microprocessor, and is approximately 25 mm in length. A node may provide a file system for use with persistent applications. Further, a node typically includes sensors and/or actuators for interaction with the outside environment, and a communication device for transferring data to and from other nodes 115A and host server 105. In one embodiment, the communication device is a low-power radio with a range of 100 meters and a data rate of 250 kilobytes per second (kbps). It is appreciated that nodes 115A need not have precisely or even approximately these specifications, but rather any sort of architecture or resources sufficiently different from that of a client 110 so as to cause the nodes 115A and client 110 to have different software execution environments. Other examples of nodes include the individual components of heating, ventilation, and air conditioning (HVAC) or power distribution systems in buildings.

Described at a logical level, a node 115A comprises a physical layer 205, an execution environment layer 210, a system services layer 215, and an application layer 220. The physical layer 205 includes the resources noted above, including a communication device such as a radio transmitter, sensors and actuators, and persistent and non-persistent storage devices such as RAM and flash memory. The execution environment layer 210 in one embodiment includes an embedded kernel for providing basic operating system functionality such as access to memory and I/O devices. The execution environment layer 210 may further include a language runtime for executing programs. For example, in one embodiment the client 110 and node 115A programs are written with the Java programming language, and the node execution environment layer 210 thus includes a Java Virtual Machine to execute node programs, although such a Java Virtual Machine is specialized in order to accept smaller, more optimized object formats, for example. In such an embodiment, the execution environment layer 210 is stored in a persistent storage medium, such as read-only memory (ROM) or flash memory, and may be loaded into RAM when the node 15A begins to operate. In another embodiment, the execution environment layer 210 may be executed, partially or entirely, directly from the persistent storage medium, rather than first being loaded into RAM.

The system services layer 215 includes a number of services that support the operations of programs run on the node 115A. For example, the system services layer 215 includes implementations of networking protocols, such as IEEE standard 802.15.4, used to send and receive data. It also includes implementations of protocols specific to the node network 115. For example, in one embodiment, nodes of the node network 115 run an object distribution protocol based on forwarding that ensures that all participating nodes have the latest version of the object in question, and an object dispatcher protocol that accepts and responds to messages based the type of an object type contained in the message.

The system services layer 215 further includes services for using any sensors and/or actuators included as part of the node 115A, such as reading the values provided by a temperature sensor. It further includes file system services for persistently storing data on the node 115A itself, and a driver registry for accessing peripherals, communication protocols, and other hardware components. In one embodiment, the services of system services layer 215 are stored in flash memory and loaded into RAM when the node begins to operate. In another embodiment, the services may be executed, partially or entirely, directly from the persistent storage medium, rather than first being loaded into RAM.

The application layer 220 includes programs executed by the node 115A. Programs could include, for example, monitoring a value provided by a temperature sensor and sending a notification if it exceeds some threshold, or specifying a policy regulating the communication interface, or setting control values for an actuator needed to implement an appropriate response, often based on sensor input. In one embodiment, the programs are stored in the persistent storage medium of the node 115A, e.g., within flash memory, and are executed directly from the persistent storage medium. In another embodiment, the programs are not persistently stored on the node 115A, but rather are received via the communications device and loaded into RAM during the execution of the node 115A. Other embodiments combining these approaches, such as persistently storing the applications and partially loading them into RAM, are equally possible. The program code that is executed includes calls to the services of the system services layer 215.

Figure 3:
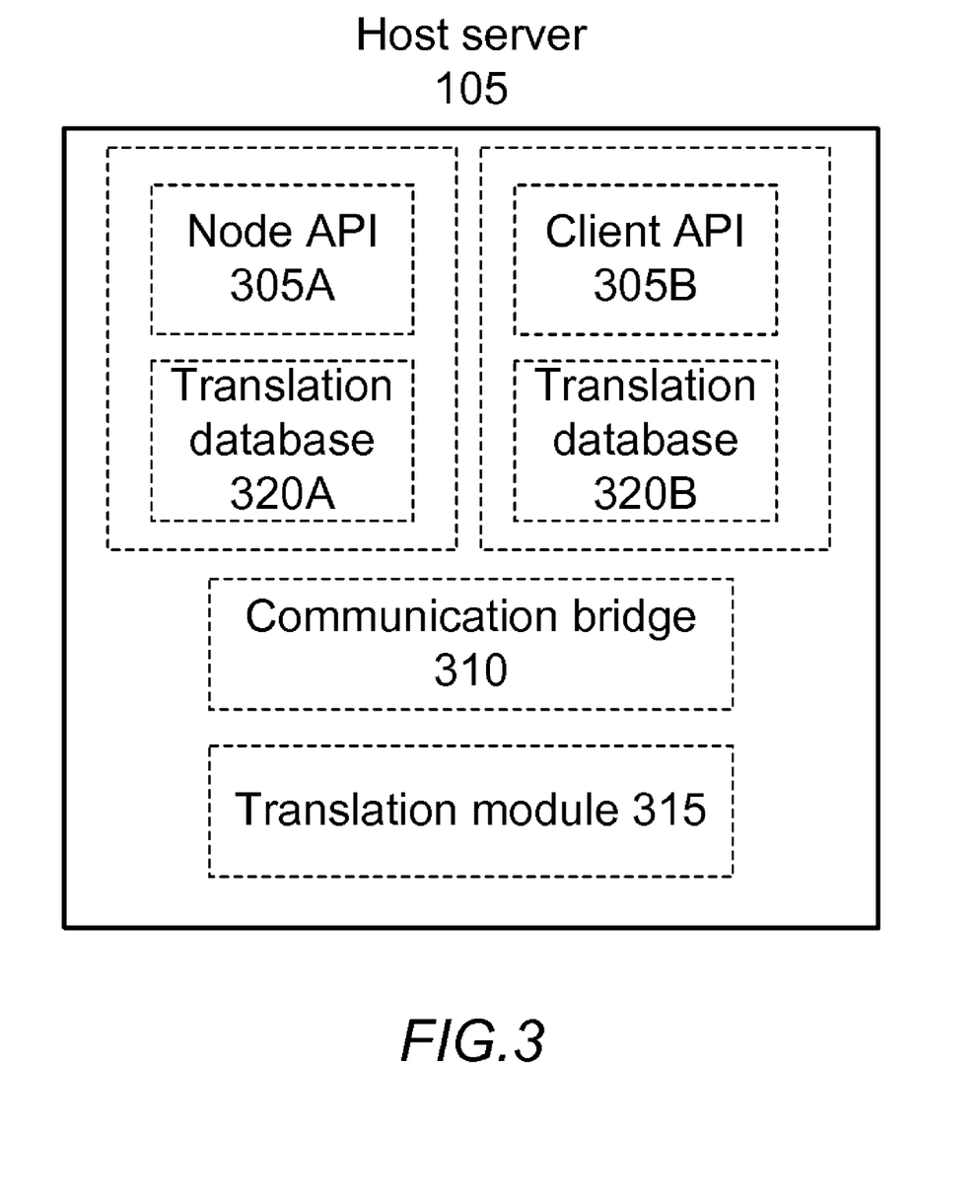
FIG. 3 illustrates in greater detail the design of a server, known as a "host server", according to one embodiment.

FIG. 3 illustrates in greater detail the logical design of the host server 105, according to one embodiment. As previously noted, the virtual node 106 of the host server 105 acts as an intermediary between a node 115A and a client 110, bridging the gap between the different physical machines so that they appear the same from a software and communications protocol perspective. This allows application development using a consistent language and application programming interface (API) across all parts of the system. For example, during deployment of a program to the various nodes 115A of the node network 115, the host server 105 transparently translates a node application developed on a client 110 into a form that can be efficiently executed by a node 115A. Conversely, the host server 105 likewise transparently translates data values from a form used by a more powerful client 110 to that used by a less powerful node 115A.

The following description of the actions of the host server 105 relates to an example embodiment in which the client and node programs are written using the Java programming language and executed using a Java Virtual Machine runtime. Java programs are composed of objects, and the class files embodying them—including those with main( ) methods, which therefore can act as executable programs—are themselves represented as objects, and the example embodiment thus particularly focuses on the handling of objects. It is appreciated, however, that the invention is not limited to program development in the Java programming language or even to object-oriented programming languages and object models in general, but rather is applicable to systems in which the execution environment of the client 110 differs from that of a node 115A.

In the example embodiment, the host server 105 includes a node API 305A and a client API 305B, a communication bridge 310, a translation module 315, and translation databases 320A and 320B, which together provide the functionality required to properly translate between a client 110 and a node 115A. Each instance of a virtual node 106, such as an instance for a particular type of node such as a power distribution system component, has its own node API 305A and translation database 320A. Similarly, each instance of a virtual client 107, such as an instance for a particular type of client, has its own client API 305B and translation database 320B. The node API 305A allows the host server 105 to emulate a node 115A. Because the physical resources of the nodes 115A are limited, the various nodes 115A communicate as if they were speaking only to other nodes 115A, thus freeing them from the extra processing requirements of determining the source or destination of a message and performing any necessary translation between formats. The node API 305A allows the host server 105 to emulate functions of a node, thereby in effect creating a virtual node 106 within the host server 105. In this way, the nodes can interact with the virtual node 106 in the host server 105 as if the host server 105 were merely another node.

In order to fully allow this virtual node 106 to simulate a physical node 115A, the node API 305A for the virtual node instance corresponding to the type of the node 115A includes an implementation of each node protocol run by system services layer 215 of a node 115A. For example, to distribute a program or data value from a client 110 to the various nodes 115A of the node network 115, the client calls an appropriate function of the node API 305A of the host server 105 and passes the program or data value to that API function. The host server 105 then executes the API function, which simulates the node object distribution protocol, e.g., by packaging the program or data value within a message packet along with an appropriate version number and a code indicating that the packet relates to the node object distribution protocol, as done by the node object distribution protocol itself. This may also require that the program or data value packaged within the message packet be properly translated to a form usable by a node 115A, as described below in conjunction with the translation database 320A.

Similarly, when receiving a message packet from the nodes 115A that is formatted according to the node object distribution protocol, for example, the host server 105 examines the message packet and recognizes, via an appropriate code in the packet header, that the message packet is intended for distribution to other nodes 115A and clients 110. Consequently, the host server 105 calls the node API function implementing the node object distribution protocol and thereby retransmits the message packet in order to reach nodes 115A that may have been out of communication range of the other nodes. The host server 105 also translates and transmits to clients 110 any application classes or objects contained within the message.

The translation module 315 accounts for the different object formats and other data formats used by the clients 110 and by the nodes 115A by translating objects as appropriate. For example, when a client 110 wishes to have the node network 115 run a particular program embodied in a given Java class, the translation module 315 translates the class from the standard Java class format used by the client 110 to the optimized format suitable for the more constrained physical resources of a node 115A. This translation involves reconstructing the class file created on the client 110 by a standard Java compiler, including re-linking by updating the references to standard Java classes to reflect their node-optimized equivalents, resizing primitive and reference variables to reflect their smaller, more memory-efficient representations within the node-optimized version of the Java Virtual Machine used to execute code on the nodes 115A, changing memory references as needed to reflect repositioning in memory of the resized variables, and re-applying the applicable digital signature algorithm to the node-optimized version of the class if the original class had been signed. Translation of abstract classes, interfaces, and the like is performed in similar fashion.

Similarly, when an object is transferred from a client 110 to a node 115A, the translation module 315 translates the object from a standard client representation to a node-optimized representation. In one embodiment, this is performed by de-serializing the byte stream representation of the object provided by the client 110, and then re-serializing the object in a node-optimized representation before sending it over the network to the node 115A. When an object refers to other objects, this translation process is performed recursively until all objects have been translated to node-optimized representations. The process is similar when transferring in the other direction, from a node 115A to a client 110.

In one embodiment, the object translation module 315 can translate between many different object formats. For example, it can receive a Java Archive ("JAR") file storing program class files from a client 110, extract the individual class files from the JAR file, and translate each from the class file format of the Java Virtual Machine of the client 110 to the node-optimized format of the nodes 115A. As another example, the host server 105 can receive an object specified in the Simple Object Access Protocol (SOAP), using the client protocols of the virtual client 107 to accept the object using SOAP, and the object translation module 315 can translate the SOAP object from XML to the node-optimized object format of the nodes 115A.

The translation database 320 stores the results of the translation module 315 so as to speed up future data transfers. For example, the first time that a client 110 wishes to deploy a particular version of a program on the node network 115, the host server 105 stores both the class file embodying the application and the node-optimized version provided by the translation module 315 within the translation database 320A for the virtual node for the appropriate node type. The translation database 320 is additionally updated to include a mapping between the client and node versions of the program. In one embodiment, the translation database is a conventional relational database, with optimized and non-optimized class files stored as binary objects in a class table with a unique identifier—such as the fully qualified class name—as the primary key, and pairs of unique identifiers relating the original class file and node-optimized class file stored in a second table.

The communication bridge 310 serves as the intermediary between the client 110 and the node network 115. When a message packet arrives from a node 115A or a client 110, the communication bridge examines the message, employing the node API 305A as described above to create a message for the node network 115, or to receive a message from the node network 115, as the case may be. This includes performing class or object translation via the translation module 315. After classes and objects have been properly translated and messages formatted via the node API 305A to conform to the desired destination (i.e. a client 110 and/or the node network 115), the communication bridge 310 then sends the resulting message using the network protocols and network interface that are associated with the destination.

It should be noted that that virtual client 107 of the host server 105 can perform any translation necessary for communication between host server 105 and the clients 110 in a similar fashion to the above-described translation between the host server 105 and the nodes 115A performed by the virtual node 106. For example, if the clients 110 communicate using Web Services protocols such as SOAP, the virtual client 107 implements the protocols using the client API 305B, thus allowing the clients 110 to communicate with it as if it were another client. Similarly, if a client 110 happens to use a software execution environment different from that of the host server 105, the virtual client 107 can perform data format translations similar to those performed by the virtual node 106 using the translation database 320B.

Figure 4:
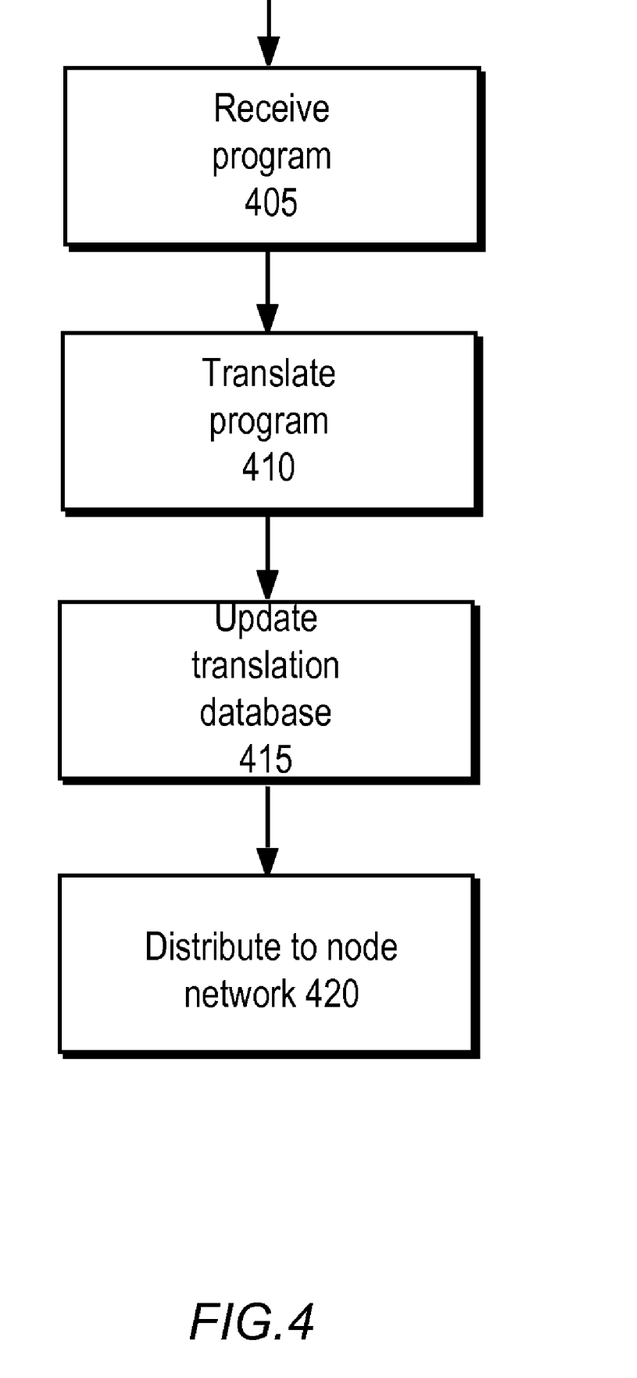
FIG. 4 is a flowchart illustrating the steps taken in distributing a program or data to nodes, according to one embodiment.

FIG. 4 is a flowchart illustrating the steps taken by the host server 105 in distributing a program or data to a node 115A, according to one embodiment.

Initially, the host server 105 receives 405 a program to be distributed to all nodes 115A, or to a subset thereof. This may occur, for example, after a user creates programs to be executed on the clients 110 and nodes 115A and, and indicates using user interface functionality on the client 110 that the node programs are to be deployed on the appropriate nodes 115A. For example, after successful program compilation, a user could choose a "Deploy to nodes" option provided within the IDE used to develop the programs. As a result, the client 110 would transmit a copy of the node program to the host server 105 for distribution to the nodes.

The host server 105 then translates 410 the program from the format specific to the client 110 to a format suited to execution by a node 115A. The translation process is performed by the translation module 315, as discussed above. Following translation of the program format, the translation database 320 may be updated 415, as discussed above, in order to prevent the need to repeat the translation of the program in future.

Finally, the host server 105 distributes 420 the translated, node-optimized version of the program to the appropriate nodes 115A for execution. In one embodiment, this is performed according to the distribution protocol referenced above, in which a version number is provided along with each program or object being sent, and the various nodes 115A broadcast advertisements of the latest version that they possess and/or request a copy of a newer version in response to an advertisement. If the program is of a type in which a node 115A is interested, then handler code on the node 15A reads the received code and causes it to be loaded and executed by the node 1115A.

The process of distributing objects from a client 110 to a node 115A occurs in similar manner to the distribution of programs, involving object translation from client to node formats, possible updating of the translation database 320, and distribution to the nodes 115A using a node object distribution protocol. The provision of objects in a reverse direction, from a node 115A to a client 110, is likewise similar, but with object translation being from a node to a client format, and without the need to use an object distribution protocol to deliver the object to the appropriate client 110.

It is appreciated that the operations of the invention are not limited to those involved in distributing a program, as discussed above with respect to FIG. 4; rather, the steps of FIG. 4 are merely illustrative of one example scenario in which the invention is employed—namely, translation of an object distributed from a client 110 to nodes 115A, in which the object is a program. Other equally possible scenarios include the transmission of non-program objects from nodes 115A to a client 110 and the transmission of non-object data, as well as other situations previously discussed.

In sum, the embodiments described above provide a uniform software platform to software developers creating applications for pervasive computing systems. Thus, programs, whether destined to be executed on a node network or on a traditional client system, may be authored using a single programming language or object model, thus greatly simplifying application development.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing a uniform software interface in a pervasive computing environment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer program product for translating communications between a client and nodes of a node network, the client employing at least a first object format and a first data object format and the nodes employing at least a second object format and a second data object format, the computer program product comprising a non-transitory computer-readable storage medium containing computer program code for:
receiving an executable program object from the client in the first object format, the executable program object created using an object-oriented programming language;
translating the received executable program object from the first object format to the second object format, the translating comprising:
resizing data variables of the executable program object,
changing memory addresses of variables within the executable program object, and
re-computing a digital signature of the executable program object by applying a digital signature algorithm to the executable program object;
sending the executable program object in the second object format to one or more of the nodes for deployment on a plurality of the nodes;
receiving data objects in the second data object format from the executable program objects deployed on the nodes;
translating the data objects from the second data object format to the first data object format; and
sending the translated data objects to the client.

2. The computer-readable storage medium of claim 1, further comprising implementing communication protocols of the client and communication protocols of the nodes.

3. The computer-readable storage medium of claim 1, further comprising receiving the executable program object using a communication protocol of the client and sending the executable program object using a communication protocol of the nodes, wherein the communication protocol of the client and the communication protocol of the nodes are incompatible with each other.

4. The computer-readable storage medium of claim 1, further comprising examining a translation database to identify a translated version of a given object in the first object format, the translation database associating objects in the first object format with translated versions of the objects in the first object format.

5. The computer-readable storage medium of claim 1, wherein translating the executable program object comprises re-linking the executable program object.

6. The computer-readable storage medium of claim 1, wherein the executable program object was created using the Java programming language.

7. A host server adapted to translate communications between a client and nodes of a node network, the client employing at least a first object format and a first data object format and the nodes employing at least a second object format and a second data object format, the host server comprising:
a computer processor coupled to memory of the host server;
a communication bridge for:
receiving executable program objects in the first object format from the client, and sending translated versions of the executable program objects to one or more of the nodes for deployment on a plurality of the nodes, the translated versions of the executable program objects being in the second object format, and
receiving data objects in the second data object format from the executable program objects deployed on the nodes, and sending translated versions of the data objects to the client, the translated version of the data objects being in the first data object format; and
a translation module coupled to the communication bridge for translating objects in the first object format to the second object format and providing the translated objects to the communication bridge, wherein the translation module is configured to translate a particular object by:

resizing data variables of the object, and changing memory addresses of variables within the object;

wherein the translation module is configured to further translate a particular executable program object by re-computing a digital signature of the executable program object by applying a digital signature algorithm to the executable program object .

8. The host server of claim 7, further comprising an API module for implementing communication protocols of the client and communication protocols of the nodes.

9. The host server of claim 7, wherein the communication bridge receives the executable program objects using a communication protocol of the client, and sends the translated versions of the executable program objects using a communication protocol of the nodes , and wherein the communication protocol of the client and the communication protocol of the nodes are incompatible with each other.

10. The host server of claim 7, further comprising a translation database associating objects in the first object format with translated versions of the objects in the first object format, and wherein the translation module is further configured to translate the particular object by examining the translation database to identify a translated version of a given object in the first object format.

11. The host server of claim 7 , wherein translating the executable program objects comprises re-linking the executable program objects.

12. The host server of claim 7 , wherein the executable program objects were created using the Java programming language.

13. A host server for translating communications between a client and nodes of a node network, the client employing at least a first object format and a first data object format and the nodes employing at least a second object format and a second data object format, the host server comprising:

a communication bridge for:

receiving executable program objects in the first object format from the client, and sending translated versions of the executable program objects to one or more of the nodes for deployment on a plurality of the nodes, the translated versions of the executable program objects being in the second object format, and receiving data objects in the second data object format from the executable program objects deployed on the nodes, and sending translated versions of the data objects to the client, the translated version of the data objects being in the first data object format; and means for translating an object from the first object format to the second object format, the means for translating coupled to the communication bridge to receive objects in the first object format and to provide objects in the second object format, wherein the translating comprises:

resizing data variables of the object , and changing memory addresses of variables within the object;

wherein the translating of one of the executable program objects further comprises re-computing a digital signature of the executable program object by applying a digital signature algorithm to the executable program object.

14. The host server of claim 13, further comprising an API module for implementing communication protocols of the client and communication protocols of the nodes.

15. The host server of claim 13, wherein the communication bridge receives the objects using a communication protocol of the client, and sends the objects using a communication protocol of the nodes, and wherein the communication protocol of the client and the communication protocol of the nodes are incompatible with each other.

16. The host server of claim 13, wherein the executable program objects were created using the Java programming language.

17. A computer-implemented method for translating communications between a client and nodes of a node network, the client employing at least a first object format and a first data object format and the nodes employing at least a second object format and a second data object format, the method comprising:

receiving executable program objects from the client in the first object format, the executable program objects created using an object-oriented programming language;

translating the received executable program objects from the first object format to the second object format, the translating comprising:

resizing data variables of the executable program objects, changing memory addresses of variables within the executable program objects, and re-computing a digital signature of the executable program object by applying a digital signature algorithm to the executable program object;

sending the executable program objects in the second object format to one or more of the nodes for deployment on a plurality of the nodes;

receiving data objects in the second data object format from the executable program objects deployed on the nodes;

translating the data objects from the second data object format to the first data object format; and sending the translated data objects to the client.

18. A pervasive computing system comprising:

a client device adapted to execute software having a first object format and to communicate using a first communication protocol;

a network of nodes communicating via radio transmission with a range of approximately 100 meters, the nodes being approximately 25 millimeters in length and lacking a mechanical hard disk, and being adapted to execute software having a second object format and to communicate using a second communication protocol, wherein the nodes are incapable of executing software in the first object format, and wherein the first communication protocol and the second communication protocol are incompatible; and a host server adapted to translate objects between the first object format and the second object format, the translation of an object comprising:

resizing data variables of the object, changing memory addresses of variables within the object, and responsive to the object representing a program, re-computing a digital signature of the object by applying a digital signature algorithm to the object .

19. The pervasive computing system of claim 18, wherein the network of nodes comprises at least 100 nodes, none of the nodes is connected to a power grid, and none of the nodes has physical connectors for performing input and output.

20. The pervasive computing system of claim 18, wherein an object translated between the first object format and the second object format is a program.

21. The pervasive computing system of claim 18, wherein an object translated between the first object format and the second object format is a data object.

22. The pervasive computing system of claim 18, wherein translating the program comprises re-linking the program.

23. The pervasive computing system of claim 18, wherein the nodes comprise components of heating, ventilation, and air conditioning or power distribution systems in buildings.

24. The pervasive computing system of claim 18, wherein the nodes are embedded within a physical structure and are configured to monitor current physical properties of the physical structure.

25. The computer-implemented method of claim 17, wherein the data objects comprise sensor data describing a physical state of physical objects monitored by the nodes.

* * * * *

UNITED STATES PATENT AND TRADEMARK OFFICE
CERTIFICATE OF CORRECTION

PATENT NO.          : 7,991,915 B2                                    Page 1 of 1
APPLICATION NO.     : 12/432628
DATED               : August 2, 2011
INVENTOR(S)         : Polastre et al.

It is certified that error appears in the above-identified patent and that said Letters Patent is hereby corrected as shown below:

In the Specification

In Column 2, Line 46, delete "host 105" and insert -- host server 105 --, therefor.

In Column 4, Line 13, delete "kilobyes" and insert -- kilobytes --, therefor.

In Column 4, Line 54, delete "15A" and insert -- 115A --, therefor.

In Column 8, Line 40, delete "15A" and insert -- 115A --, therefor.

In Column 8, Line 42, delete "1115A." and insert -- 115A. --, therefor.

Signed and Sealed this
Twenty-seventh Day of October, 2015

Michelle K. Lee
*Director of the United States Patent and Trademark Office*